United States Patent
Armstrong et al.

[11] Patent Number: 6,134,983
[45] Date of Patent: Oct. 24, 2000

[54] MOTOR VEHICLE STEERING COLUMN AND METHOD

[75] Inventors: Ray Garnet Armstrong, Bay City; Richard Kremer Riefe, Saginaw, both of Mich.

[73] Assignee: Delphi Technologies, Inc., Troy, Mich.

[21] Appl. No.: 09/305,988

[22] Filed: May 6, 1999

[51] Int. Cl.[7] .................................................... B62D 1/18
[52] U.S. Cl. ............................ 74/493; 280/775; 267/174
[58] Field of Search .............................. 74/493; 280/775; 267/170, 174, 179

[56] References Cited

U.S. PATENT DOCUMENTS

| | | | |
|---|---|---|---|
| 2,514,394 | 7/1950 | Irving | 267/170 X |
| 3,034,170 | 5/1962 | Koebel | 267/179 X |
| 3,051,976 | 9/1962 | Dubois et al. | 267/174 X |
| 3,310,993 | 3/1967 | Kimberlin et al. | 74/493 |
| 3,851,543 | 12/1974 | Krom | 74/493 X |
| 4,058,170 | 11/1977 | Ankenman | 280/775 X |
| 4,709,592 | 12/1987 | Andersson | 74/493 |
| 4,753,122 | 6/1988 | Nishikawa et al. | 74/424.8 R |
| 4,850,239 | 7/1989 | Oosterwal | 74/493 |
| 5,911,789 | 6/1999 | Keipert et al. | 74/493 |

*Primary Examiner*—David A. Bucci
*Assistant Examiner*—Colby Hansen
*Attorney, Agent, or Firm*—Edmund P. Anderson

[57] ABSTRACT

A tilt-adjustable motor vehicle steering column including a stationary mast jacket, a tilt housing supported on the mast jacket for up and down pivotal movement, an articulated steering shaft having a lower portion rotatably supported on the mast jacket and an upper portion rotatably supported on the tilt housing, a steering hand wheel on the upper portion of the steering shaft, and a balance spring preloaded in compression flexure between an inboard spring seat on the mast jacket and an outboard spring seat on the tilt housing. The tilt housing has a spring bore therein facing the inboard spring seat. The outboard spring seat is a screw thread in the spring bore defined by a raised boss in the spring bore. The balance spring is a helical coil spring having a helix angle matching the screw thread in the spring bore. Rotation of the balance spring in the spring bore advances an inboard end of the balance spring toward the inboard spring seat. After the inboard end of the balance spring engages the inboard spring seat, continued rotation of the balance spring preloads the latter in compression flexure between the inboard and the outboard spring seats.

7 Claims, 2 Drawing Sheets

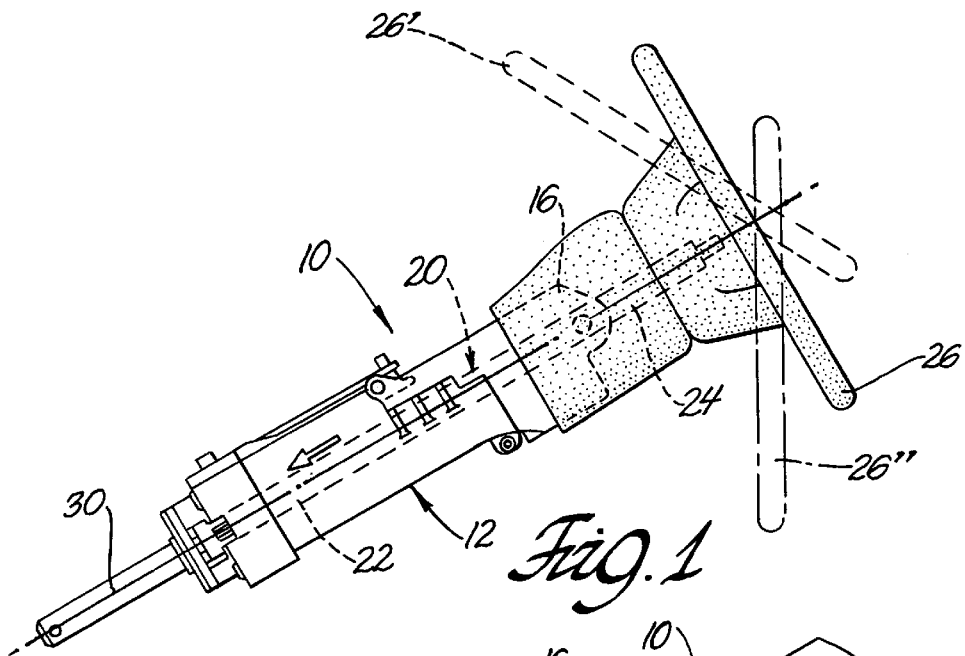
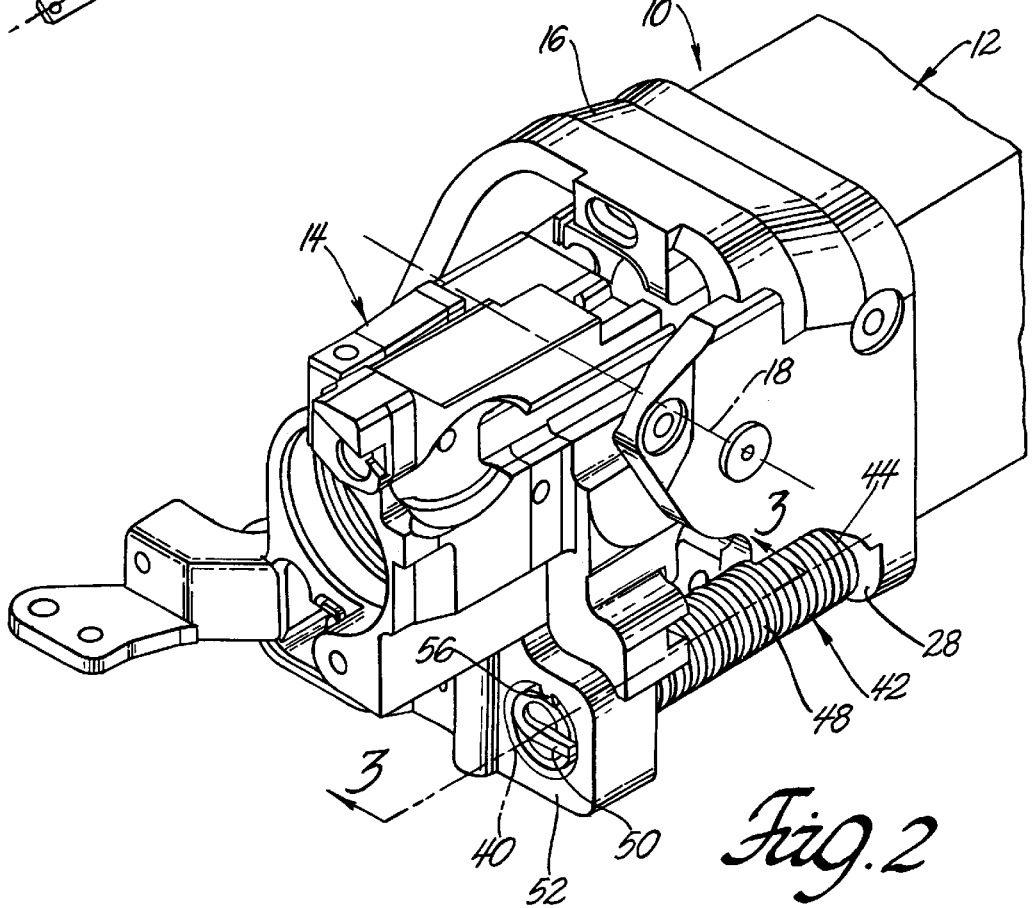

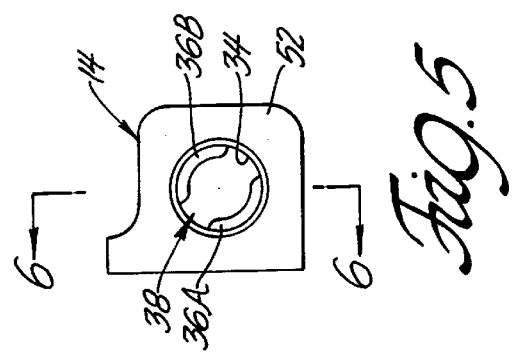
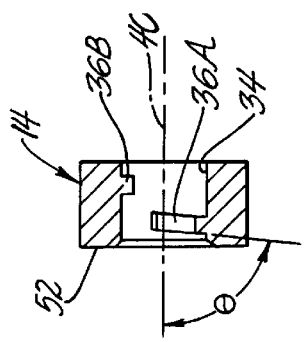
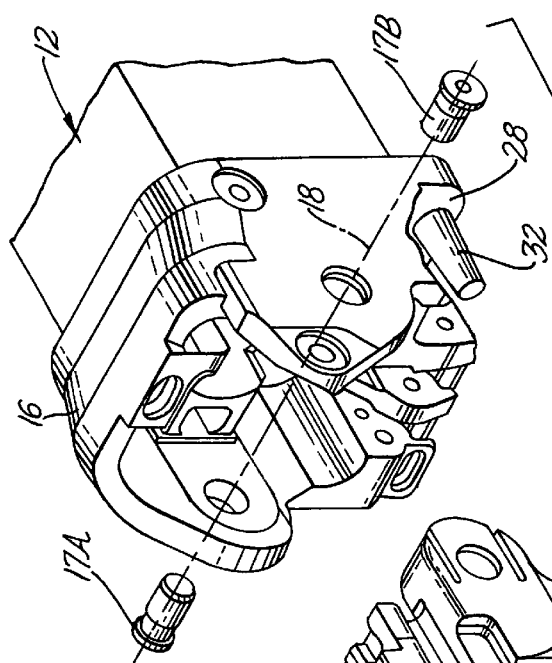
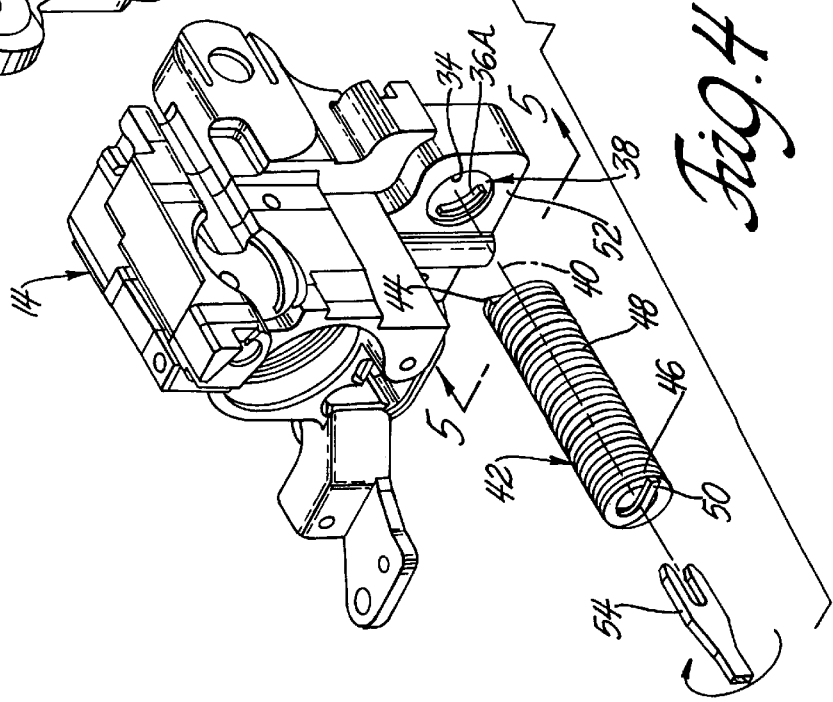

MOTOR VEHICLE STEERING COLUMN AND METHOD

TECHNICAL FIELD

This invention relates to a tilt-adjustable steering column for a motor vehicle.

BACKGROUND OF THE INVENTION

A typical tilt-adjustable motor vehicle steering column includes a stationary mast jacket, a tilt housing supported on the top of the mast jacket for up and down pivotal movement, an articulated steering shaft having a lower portion rotatably supported on the mast jacket and an upper portion rotatably supported on the tilt housing, and a steering hand wheel on the upper portion of the steering shaft. Up and down pivotal movement of the tilt housing adjusts the vertical position of the steering hand wheel. Commonly, the steering column further includes a balance spring between the tilt housing and the mast jacket which minimizes the manual effort required for upward adjustment of the position of the steering hand wheel by biasing the tilt housing toward an upper limit position of the steering hand wheel. Because the balance spring is necessarily located close to the longitudinal centerline of the steering column and because the tilt housing and the structural elements thereon are relatively heavy, the balance spring is usually a long helical coil spring trapped or preloaded in compression flexure between the mast jacket and the tilt housing. In some prior tilt-adjustable steering columns, preload compression flexure of the long balance spring is attained by arching the balance spring between spring seats on the tilt housing and the mast jacket and then thrusting the middle of the spring laterally between the spring seats. In other prior tilt-adjustable steering columns, preload compression flexure of the long balance spring is attained by compressing the balance spring longitudinally against a spring seat on the mast jacket through a bore in the tilt housing and then inserting a twist-lock style retainer in the bore behind the compressed balance spring. A tilt-adjustable motor vehicle steering column and method according to this invention are novel alternatives to such prior tilt-adjustable motor vehicle steering columns and methods.

SUMMARY OF THE INVENTION

This invention is a new and improved tilt-adjustable motor vehicle steering column including a stationary mast jacket, a tilt housing supported on the mast jacket for up and down pivotal movement, an articulated steering shaft having a lower portion rotatably supported on the mast jacket and an upper portion rotatably supported on the tilt housing, a steering hand wheel on the upper portion of the steering shaft, and a balance spring preloaded in compression flexure between an inboard spring seat on the mast jacket and an outboard spring seat on the tilt housing. The tilt housing has a spring bore therein facing the inboard spring seat. The outboard spring seat is a screw thread in the spring bore defined by a raised boss in the spring bore. The balance spring is a helical coil spring having a helix angle matching the screw thread in the spring bore. Rotation of the balance spring in the spring bore advances an inboard end of the balance spring toward the inboard spring seat. After the inboard end of the balance spring engages the inboard spring seat, continued rotation of the balance spring preloads the latter in compression flexure between the inboard and the outboard spring seats. A plastically deformed locking tab on the tilt housing behind the balance spring prevents reverse rotation thereof in the spring bore.

BRIEF DESCRIPTION OF THE DRAWINGS

FIG. 1 is an elevational view of a tilt-adjustable motor vehicle steering column according to this invention;

FIG. 2 is a fragmentary perspective view of the tilt-adjustable motor vehicle steering column according to this invention;

FIG. 3 is a sectional view taken generally along the plane indicated by lines 3—3 in FIG. 2;

FIG. 4 is a fragmentary exploded perspective view of the tilt-adjustable motor vehicle steering column according to this invention;

FIG. 5 is a view taken generally along the plane indicated by lines 5—5 in FIG. 4, and FIG. 6 is a sectional view taken generally along the plane indicated by lines 6—6 in FIG. 5.

DESCRIPTION OF THE PREFERRED EMBODIMENT

Referring to FIGS. 1,2 and 4, a motor vehicle steering column 10 according to this invention includes a stationary mast jacket 12 rigidly attachment to a body, not shown, of a motor vehicle and a tilt housing 14 supported on the mast jacket at an upper end 16 thereof by a pair of pivot pins 17A, 17B for up and down pivotal movement about a lateral pivot axis 18. A schematically represented articulated steering shaft 20 includes a lower portion 22 rotatably supported on the mast jacket 12 and an upper portion 24 rotatably supported on the tilt housing 14 and connected to the lower portion by a universal coupling, not shown, at the lateral pivot axis 18. A steering hand wheel 26 is rigidly attached to the upper portion 24 of the articulated steering shaft 20 outboard of the tilt housing 14. Up and down pivotal movement of the tilt housing adjusts the vertical position of the steering hand wheel through a range of positions between by an upper limit position 26' and a lower limit position 26", FIG. 1. A tilt lock, not shown, releasably captures the tilt housing in any of a plurality of adjusted positions between the upper and the lower limit positions.

The mast jacket 12 has a flat inboard spring seat 28 thereon at the upper end 16 thereof in a plane perpendicular to a longitudinal centerline 30, FIG. 1, of the steering column. The inboard spring seat is interrupted by a cone-shaped pilot 32 perpendicular thereto. The tilt housing 14 has a spring bore 34 therein facing the inboard spring seat 28. A pair of circumferentially separated raised bosses 36A,36B, FIGS. 3–6, in the spring bore 34 integral with the tilt housing constitute an outboard spring seat 38 on the tilt housing and cooperate in defining an interrupted internal screw thread in the spring bore having a predetermined helix angle $\theta$, FIG. 6, relative to a longitudinal centerline 40 of the spring bore.

A balance spring 42 of the steering column 10 is preloaded in compression flexure between the inboard and the outboard spring seats 28,38 and includes an inboard end 44 seated on the inboard spring seat 28 around the pilot 32 thereon and an outboard end 46 seated on the outboard spring seat 38 defined by the raised bosses 36A,36B. The balance spring further includes a plurality of helical coils 48 having a helix angle generally matching the helix angle $\theta$ of the internal screw thread defined by the raised bosses 36A,36B and a driver 50 outboard of the raised bosses defined by a laterally bent end coil of the balance spring. The thrust of the balance spring biases the tilt housing 14 upward toward the upper limit position 26' of the steering hand wheel 26 to reduce the manual effort required to effect upward adjustment of the position of the steering hand wheel.

The method by which the balance spring 42 is preloaded in compression flexure between the mast jacket 12 and the tilt housing 14 constitutes an important feature of this invention and includes the steps of forming the mast jacket with the inboard spring seat 28 and the raised pilot 32 thereon and the tilt housing with the spring bore 34 therein and the raised bosses 36A,36B in the spring bore. Importantly, the circumferential separation between the raised bosses 36A,36B facilitates quick withdrawal of a mold core, not shown, from the spring bore when the tilt housing is manufactured by a casting process, e.g. by die casting.

After the tilt housing is attached to the mast jacket by the pivot pins 17A,17B for up and down pivotal movement, the inboard end 44 of the balance spring is inserted into the spring bore 34 through an outer surface 52 of the tilt housing. The balance spring 42 is then engaged at the driver 50 by a schematically represented driving tool 54, FIG. 4, and rotated about the longitudinal centerline 40 of the spring bore. The internal screw thread defined by the raised bosses 36A,36B cooperates with helical coils 48 of the balance spring in converting rotation of the balance spring into linear translation thereof relative to the tilt housing in the direction of the longitudinal centerline 40 of the spring bore which advances the inboard end 44 of the balance spring toward the inboard spring seat 28.

After the inboard end 44 of the balance spring engages the inboard spring seat 28, continued rotation of the balance spring in the spring bore induces compression flexure of the balance spring between the inboard and outboard spring seats. When the driver 50 on the balance spring is about flush with the outer surface 52 of the tilt housing, the driving tool 54 is removed and a locking tab 56, FIGS. 2–3, is formed on an edge of the spring bore by plastically deforming or "staking" the edge behind the balance spring to prevent reverse rotation thereof in the spring bore. The balance spring 42 is thus positively captured in compression flexure between the inboard and outboard spring seats 28,38 biasing the tilt housing toward the upper limit position 26' of the steering hand wheel 26.

Having thus described the invention, what is claimed is:

1. A tilt-adjustable motor vehicle steering column including a stationary mast jacket, a tilt housing having a steering hand wheel rotatably mounted thereon supported on the stationary mast jacket for up and down pivotal movement between an upper limit position of the steering hand wheel and a lower limit position of the steering hand wheel, and a balance spring means operative to resiliently bias the tilt head toward the upper limit position of the steering hand wheel, characterized in that the balance spring means comprises:

an inboard spring seat on the mast jacket, a spring bore in the tilt housing facing the inboard spring seat, a raised boss means defining an outboard spring seat in the spring bore in the form of an internal screw thread in the spring bore having a predetermined helix angle relative to a longitudinal centerline of the spring bore, and a balance spring having an inboard end bearing against the inboard spring seat and an outboard end bearing against the outboard spring seat defined by the raised boss means and a plurality of helical coils having a helix angle generally matching the predetermined helix angle of the internal screw thread defined by the raised boss means, the internal screw thread defined by the raised boss means cooperating with the helical coils of the balance spring in converting rotation of the balance spring in the spring bore about the longitudinal centerline thereof into linear translation of the balance spring in the direction of the longitudinal centerline of the spring bore to preload the balance spring in compression flexure between the inboard spring seat and the outboard spring seat.

2. The tilt-adjustable motor vehicle steering column recited in claim 1 further comprising:

a driver means on the balance spring at the outboard end thereof engageable by a driving implement to rotate the balance spring in the spring bore about the longitudinal centerline of the spring bore.

3. The tilt-adjustable motor vehicle steering column recited in claim 2 wherein the raised boss means comprises:

a pair of circumferentially separated raised bosses integral with the tilt housing in the spring bore cooperating in defining the internal screw thread in the spring bore having the predetermined helix angle.

4. The tilt-adjustable motor vehicle steering column recited in claim 3 wherein the driver means on the balance spring comprises:

a coil of the balance spring at the outboard end thereof bent laterally across the balance spring.

5. A method of preloading a balance spring in compression flexure between a stationary mast jacket of a tilt-adjustable motor vehicle steering column and a tilt housing supported on the mast jacket for up and down pivotal movement comprising the steps of forming an inboard spring seat on the mast jacket, forming a spring bore in the tilt housing facing the inboard spring seat, forming a raised boss means in the spring bore defining an outboard spring seat on the tilt housing in the form of an internal screw thread in the spring bore having a predetermined helix angle, forming a balance spring including an inboard end and an outboard end and a plurality of helical coils therebetween having a helix angle generally matching the predetermined helix angle of the internal screw thread defined by the raised boss means, and inserting the inboard end of the balance spring into the spring bore through an outer surface of the tilt housing and rotating the balance spring in the spring bore so that the internal screw thread defined by the raised boss means cooperates with the helical coils of the balance spring in converting rotation of the balance spring in the spring bore about a longitudinal centerline thereof into linear translation of the balance spring in the direction of the longitudinal centerline of the spring bore to preload the balance spring in compression flexure between the inboard spring seat and the outboard spring seat.

6. The method of preloading a balance spring in compression flexure between a stationary mast jacket of a tilt-adjustable motor vehicle steering column and a tilt housing supported on the mast jacket for up and down pivotal movement recited in claim 5 wherein the step of forming the balance spring further comprises the step of forming on the balance spring at the outboard end thereof a driver whereat the balance spring is engaged by a driving implement to rotate the balance spring in the spring bore about the longitudinal centerline thereof.

7. The method of preloading a balance spring in compression flexure between a stationary mast jacket of a tilt-adjustable motor vehicle steering column and a tilt housing supported on the mast jacket for up and down pivotal movement recited in claim 6 wherein the step of forming on the balance spring at the outboard end thereof a driver comprises the step of bending a coil of the balance spring at the outboard end thereof laterally across the balance spring.

* * * * *